(12) United States Patent
Ellerman

(10) Patent No.: US 7,471,206 B1
(45) Date of Patent: Dec. 30, 2008

(54) FLOAT ASSEMBLY LIGHT INDICATOR FOR CHRISTMAS TREE STAND

(76) Inventor: David Christian Ellerman, 604 Robinson Ave., Piqua, OH (US) 45356

( * ) Notice: Subject to any disclaimer, the term of this patent is extended or adjusted under 35 U.S.C. 154(b) by 208 days.

(21) Appl. No.: 11/468,454

(22) Filed: Aug. 30, 2006

(51) Int. Cl.
*G08B 21/00* (2006.01)

(52) U.S. Cl. .................. 340/603; 340/604; 340/605; 340/618; 340/620; 340/62; 340/628; 47/40.5

(58) Field of Classification Search .......... 340/603, 340/604, 605, 618, 620, 621, 628; 47/40.5
See application file for complete search history.

(56) References Cited

U.S. PATENT DOCUMENTS

| | | | |
|---|---|---|---|
| 4,930,252 A | 6/1990 | Krause et al. | |
| 5,799,437 A * | 9/1998 | Evans et al. | ............... 47/40.5 |
| 6,073,390 A | 6/2000 | Baudier | |
| 6,087,946 A | 7/2000 | Menard | |
| 6,088,960 A | 7/2000 | Hartzog | |
| 2004/0124987 A1* | 7/2004 | Moretz | ............... 340/604 |
| 2004/0261854 A1 | 12/2004 | Bolster | |

* cited by examiner

*Primary Examiner*—Tai T Nguyen
(74) *Attorney, Agent, or Firm*—R. William Graham

(57) ABSTRACT

A float assembly light indicator for use in detecting water levels within a container, such as a Christmas tree stand, includes a float housing having multiple float switches therein and are operably connected to a remotely locatable water level light indicator.

5 Claims, 4 Drawing Sheets

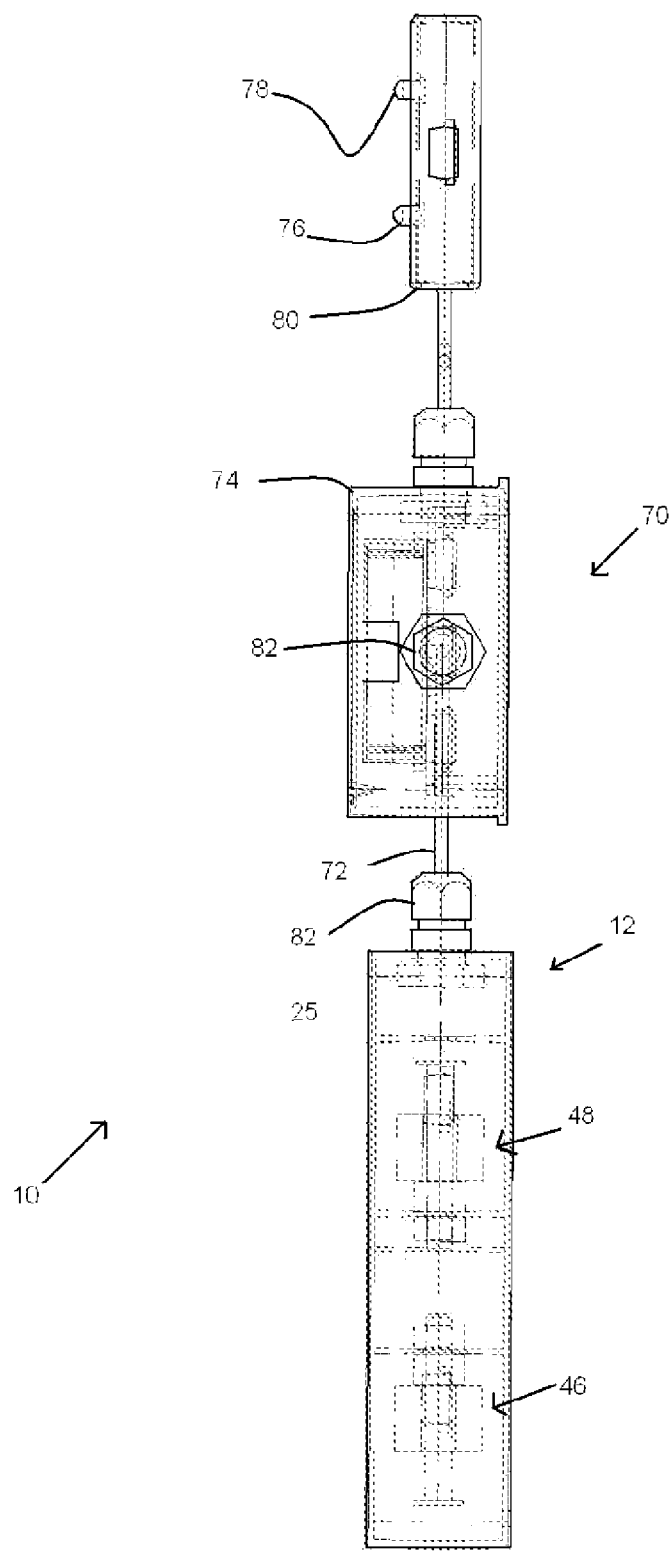

FLOAT ASSEMBLY LIGHT INDICATOR FOR CHRISTMAS TREE STAND

BACKGROUND OF THE INVENTION

1. Field of Invention

This invention relates generally to a water level indicator for a plant, and more particularly to a float assembly light indicator for a Christmas tree stand for maintaining the desired water level therein.

2. Prior Art

In the case of providing plants and trees, particularly those fresh cut, in containers and stands, water levels must be maintained in order to supply a continual need of water to the plant or tree. If levels fall below a required level, this can result in a loss of plant life. If the level is too high, it can result in an overflow and potentially damage the surface upon which the plant is disposed, such as indoor carpet. Thus, the water level must be refilled in an appropriate manner to periodically to replenish the water which is absorbed by the plant or tree or lost due to evaporation.

A number of devices exist to aid in this regard. There exist devices for refilling such containers and include the use of a backup water supply, a pumping system and water level detector system in the water reservoir such as that in U.S. Pat. No. 4,930,252. As noted in U.S. Pat. No. 6,088,960, such device can have operation drawbacks due to salts and minerals build up in the water reservoir and have a short life.

Various other devices exist to alert as to low water levels. Also, U.S. Pat. No. 6,088,960 provides alerts as the water level is at a maximum. However, the prior designs have functional drawbacks in their design and can pose a risk to the user.

There is a need to improve upon the art by providing a device which will alert the user of low and high water levels in such containers. In addition, there is a need to provide an improved water level detection device which minimizes risk to the user.

SUMMARY OF THE INVENTION

It is an object to improve water level indicator devices.

It is another object to provide a water level indicator for a potted plant which is capable of alerting when the water level is low and when the water level is high.

It is yet another object to provide a float assembly light indicator for a Christmas tree stand.

It is still another object to provide a water level indicator for a potted plant safety device includes a light indicator housing which is separately disposed from the plant in a manner to be visually apparent.

Another object is to provide a remotely located water level indicator.

Accordingly, the present invention is directed to a float assembly light indicator for use in detecting water levels within a container, such as a Christmas tree stand. The float assembly light indicator comprises a float housing which is operably disposed in the container, wherein the float housing includes a first lower opening and second upper opening through which water can pass into the housing.

The float housing includes a first float switch mechanism which is disposed in the housing in a manner to travel between a water low indicator position and a water sufficient position. The float housing includes a second float switch mechanism which is disposed in the housing in a manner to travel between a water sufficient indicator position and a water high position.

The first float switch mechanism and second float switch mechanism are operably connected to a power source. The first float switch mechanism is operably connected to a first low level light indicator and the second float switch mechanism is operably connected to a second high level light indicator. At the water low position, the first float switch mechanism is actuated thereby gaining power from the power source and illuminating the low level light indicator. At the water high position, the second float switch mechanism is actuated thereby gaining power from the power source and illuminating the high level light indicator.

The float switch mechanisms can include a magnetic or proximity switch mechanism therein. The low level light indicator and high level light indicator can be operably housed within a light housing which is flexibly connected to the float housing by way of suitably insulated electrical conductive line. Optionally, the light housing can be equipped with a power source and receiver/switch and the float switch housing can be connected to a power source and transmitter to send a signal to the receiver to actuate the light indicators.

These and other advantages are provided in a float assembly light indicator of water level of the present invention and will be apparent from reading the description and viewing the drawings hereinafter.

BRIEF DESCRIPTION OF DRAWINGS

FIG. 1C is a side view illustrating the embodiment of FIG. 1A.

DETAILED DESCRIPTION OF THE INVENTION

Figure 1A:
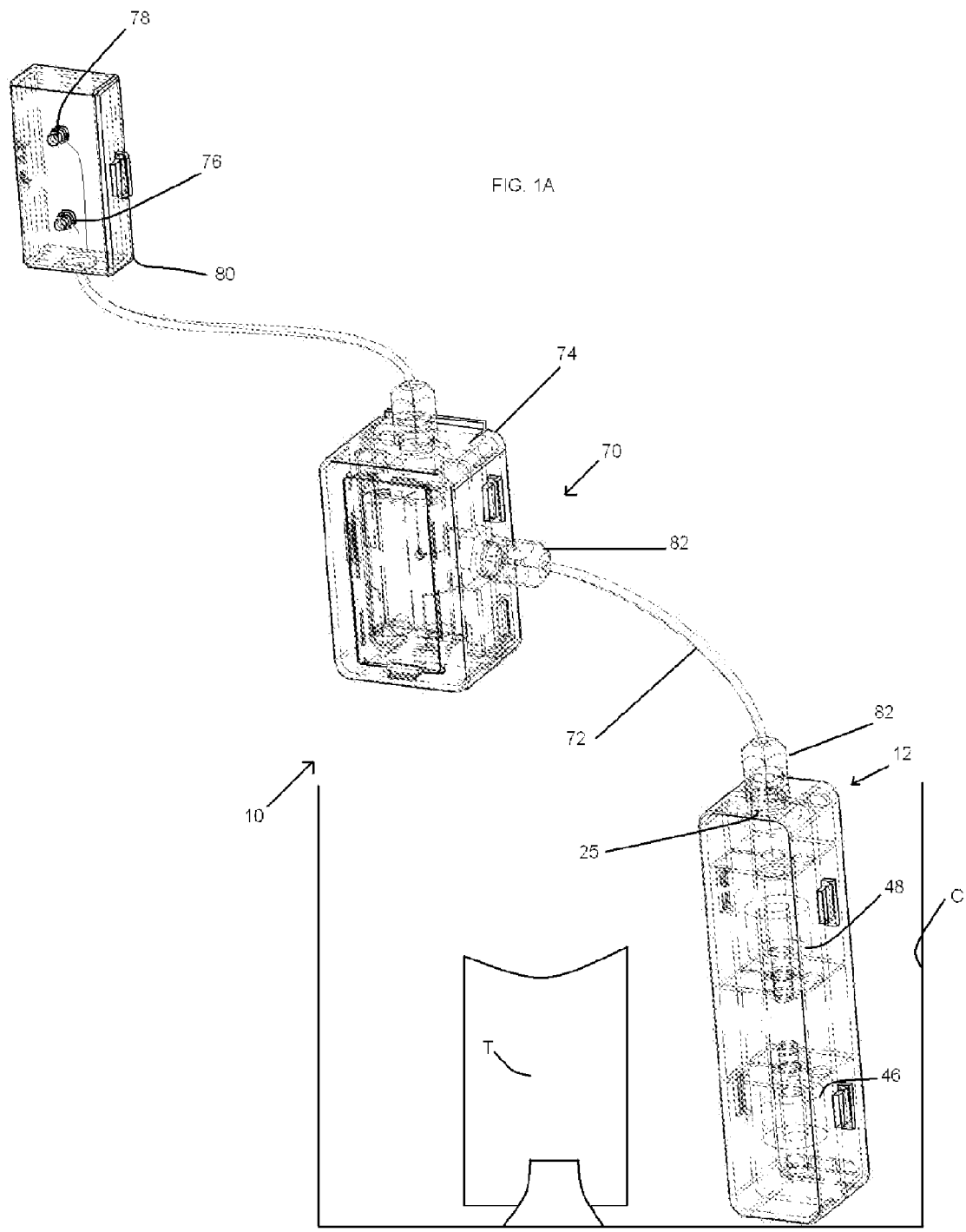
FIG. 1A is a perspective view illustrating one embodiment of the present invention in use.

Referring now to the drawings, a float assembly light indicator is generally denoted by the numeral 10 and is for use in detecting water levels within a container C, such as a Christmas tree stand. The float assembly light indicator 10 comprises a float housing 12 which is operably disposed in the container C. The float housing 12 can be of clam shell type made of plastic for example and includes two like formed shell portions 14A and 14B. Shell portion 14A includes a back 16 A, side walls 18A and 20 A, end walls 22A and 24A which form the shell portion 14a. End wall 24A includes a recessed surface 25 A. A lower transverse divider portion 26A interconnects side walls 18A and 20A and includes recessed surfaces 21A, 28A and 29 A. A mid-transverse divider portion 30A interconnects side walls 18A and 20A and includes recessed surfaces 31A, 32A and 33 A. An upper transverse divider portion 34A interconnects side walls 18A and 20A and includes recessed surfaces 35A, 36A and 37 A. Side walls 18A and 20A include female connector portions 38A and 40 A. Shell portion 14B is similarly configured to shell portion 14A with the exception that shell portion 14B includes male connector portions 38B and 40B to enable mating together. Accordingly, all corresponding numbered parts are disposed adjacent one another, such as side wall portions 18A and 18B and 20A and 20B, end wall portions 22A and 22B, 24A and 24B, divider portions 26A and 26B, 30A and 30B, and 34A and 34B. Also, shell portion 14A includes first lower openings 42 and second upper openings 44 through which water can pass into and through the housing 12.

When the shell portions 14A and 14B are mated together, recessed surfaces 21A and 21B, 28A and 28B, 29A and 29B, 31A and 31B, 32A and 32B, 33A and 33B, 35A and 35B, 36A and 36B and 37A and 37B, each form a respective opening 21, 28, 29, 31, 32, 33, 35, 36 and 37. Openings 29, 33 and 37 permit water flow through to openings 42 and 44. Openings 21, 31 and 35 provide for electrical connection between components as well as maintain position thereof.

The float housing 12 includes a first float switch mechanism 46 which is disposed in the float housing 12 in a manner to travel between a water low indicator position and a water sufficient position. The float housing 12 includes a second float switch mechanism 48 which is disposed in the float housing 12 in a manner to travel between a water sufficient indicator position and a water high position.

The first float switch mechanism 46 has a post 50 having a threaded end 52 which extends through opening 28 (formed by recessed portions 28A and 28B) and with nuts 54 is secured in a fixed position with respect to divider 26 (26A and 26B). A remaining end 56 extends toward end wall 22 (22A and 22B) and includes part of switch mechanism 46. A float 58 is movably disposed about the post 50 in a manner to be retained between the end 56 and nut 54 such that when the float 58 contacts end 56, the switch mechanism 46 is actuated. The float switch mechanisms 46 and 48 can include a magnetic or proximity switch mechanism therein.

Likewise, the second float switch mechanism 48 has a post 60 having a threaded end 62 which extends through opening 32 (formed by recessed portions 32A and 32B) and with nuts 64 is secured in a fixed position with respect to divider 30 (30A and 30B). A remaining end 66 extends toward end wall 24 and includes part of switch mechanism 48. A float 68 is movably disposed about the post 60 in a manner to be retained between the end 66 and nut 64 such that when the float 68 contacts end 64, the switch mechanism 48 is actuated.

The first float switch mechanism 46 and second float switch mechanism 48 are operably connected to a power source 70 via an electrical line 72. The power source 70, such as a small voltage battery—here shown to be AA dry cell batteries, can be stored in a housing 74 which can be plastic or other suitable material and can be constructed in a clam shell manner. The first float switch mechanism 46 is operably connected to a first low level light indicator 76 and the second float switch mechanism 48 is operably connected to a second high level light indicator 78, which shown here can include a light of one color and another light of another which are housed in a light housing 80 which can be plastic or other suitable material. The low level light indicator 76 can be a light emitting diode of a desired color such as green and the second high level light indicator 78 can be a light emitting diode such as red.

At the water low position, the float 58 and end 56 actuate the first float switch mechanism 46 thereby gaining power from the power source 70 and illuminating the low level light indicator 76. At the water high position, the float 68 and end 66 actuate the second float switch mechanism 48 thereby gaining power from the power source 70 and illuminating the high level light indicator 78. The low level light indicator 76 and high level light indicator 78 can be operably flexibly connected to the housing 74 which in turn can flexibly electrically connect to float housing 12. For example, a suitably insulated electrical conductive line can be employed. Optionally as later described, the low level light indicator 76 and high level light indicator 78 can be communicatively connected to the float housing 12 via an electronic signaling device. Sleeve lock nuts 82 can be employed to secure the line 72 through opening 25 (25A and 25B) in the end 24 (formed by end wall portions 24A and 24B). It is contemplated that the power source 70 can be part of or housed within light housing 80. It is preferable that the line 72 have sufficient length so that it may be sufficiently displaced from the plant/tree with which it is used. In this way, the light housing 80 can be temporarily disposed to on a wall, mantle, counter top, or window using a suitable connection means where necessary, such as sticky back tape for example.

The plant/tree T is supported in a container/stand C and is capable of holding water. The float housing 12 is immersed in the water such that the end 22 is disposed adjacent a bottom of the container/stand C. As the water level changes in an amount sufficient to cause one of the floats 58 or 68 to fall or rise to a point in or out of contact with a respective end 56 or 66, the respective low level light indicator light 76 or high level light indicator 78 illuminates.

By virtue of the flexible connection to the float housing 12, the light housing 80 can be readily disposed away from the plant/tree T in a manner to more readily permit visual inspection thereof and call to the attention of the user the water level. Further, the invention is less susceptible to corrosion.

If the low water indicator light 76 is extinguished the water level is sufficient. If the low water indicator light 76 is illuminated water needs to be added to the stand C. When water is added the high water indicator light 78 provides a visible indication when the water level is high thus aiding to avoid over filling the container C.

Figure 1B:
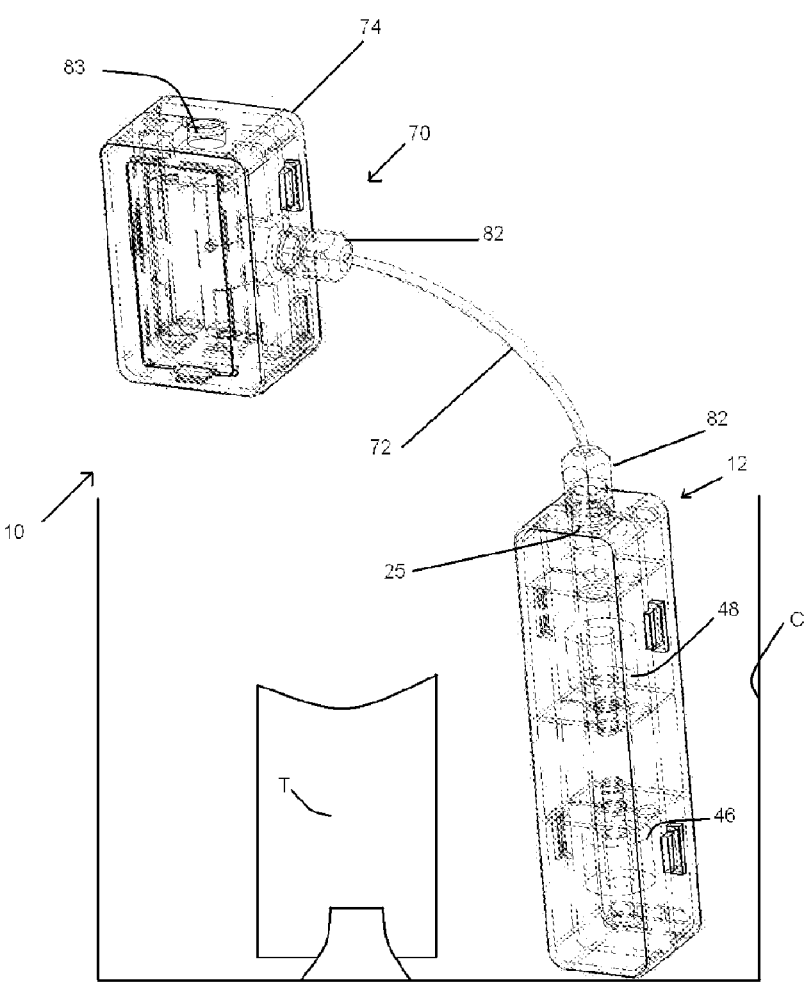
FIG. 1B is a perspective view illustrating another embodiment of the present invention in use.
Figure 2:
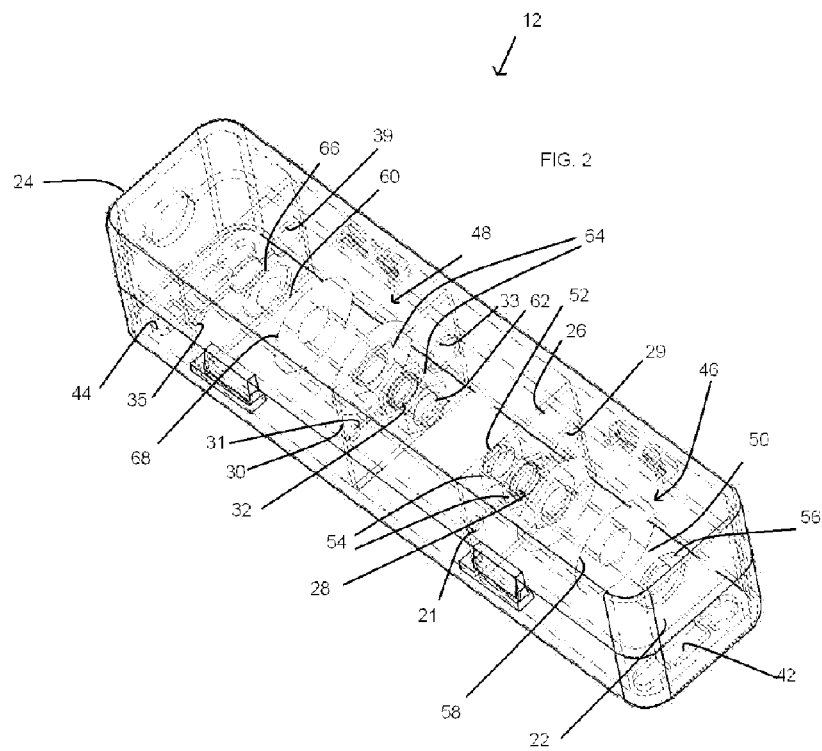
FIG. 2 is a schematic representation illustrating the elements of one part of the present invention.
Figure 2B:
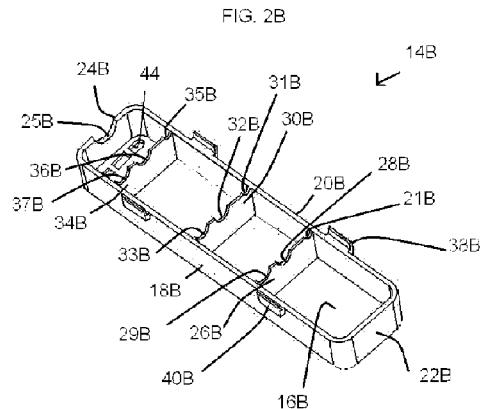
FIG. 2B is a perspective view illustrating an element of the part in FIG. 2.
Figure 2A:
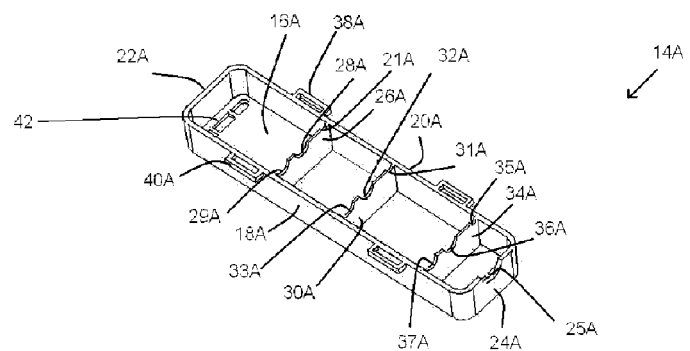
FIG. 2A is a perspective view illustrating an element of the part in FIG. 2.

In FIG. 1B, another embodiment is denoted by 10'. Here, it is further envisioned that the power source housing 74 can include a transmitter 83 and the light housing 80 can include additional power source 84 and a receiver/switch 86 which activates the low level light indicator light 76 or high level light indicator 78. In this way, the remote location of the housing 80 can be placed in a more readily visited area, such as on the refrigerator or other commonly used appliance or area, thereby indicating the need to refill water in the container C.

The preferred manner in which the invention can be practiced has been described herein. Other methods for practicing the invention may be realized by those skilled in the art without departing from the spirit of the invention as set forth in the claims.

What is claimed is:

1. An indicator for use in detecting water levels within a container, which comprises:

means operably disposable in the container for sensing water level and transmitting a signal in response to one of a high water level and low water level, wherein said sensing means includes a float housing operatively disposable in the container having an upper end and a lower end, said float housing has a lower divider extending transversely and an upper divider extending transversely therein and a first float switch mechanism has a first end of a first post secured to said lower divider and has a second end extending toward said lower end of said float housing and a first float movably disposed about said first post in a manner to be retained between said second end of said first post and said lower divider such that when said first float contacts a terminal point of said second end of said first post, said float switch mechanism is actuated in a manner to cause activating a low level indicator, and a second float switch mechanism has a first end of a first post secured to said upper divider and has a second end extending toward said upper end of said float housing and a second float movably disposed about said second post in a manner to be retained between said second end of said second post and said upper divider such that when said second float contacts a terminal point of said second end of said second post, said second float switch mechanism is actuated in a manner to cause activating a high level indicator; and means operably associated with said transmitting means for remotely receiving said signal and activating an alerting device of one of said high water level and said low water level.

2. The indicator of claim 1, wherein said float housing includes an opening through which water can pass through said float housing, said first float switch mechanism operably disposed in said float housing in a manner to travel between a water low indicator position and a water sufficient position, and said second float switch mechanism disposed in said float housing in a manner to travel between a water sufficient indicator position and a water high position, a power source operably connected to said first float switch mechanism and said second float switch mechanism; and said receiving and activating means includes said first low level indicator operably connected to said first float switch mechanism, said second high indicator operably connected to said second float switch mechanism; and wherein at said water low indicator position, said first float switch mechanism is actuated in a manner gaining power from said power source and activating said low indicator and at said water high position, said second float switch mechanism is actuated in a manner gaining power from said power source and activating the high indicator.

3. The indicator of claim 1, wherein said means for remotely receiving said signal and activating includes an indicator housing, a power source operably connected to said indicator housing, and said first low level indicator operably connected to said power source, said second high indicator operably connected to said power source, and a receiver switch for receiving said signal and activating one of said indicators.

4. The indicator of claim 3, wherein said receiving means and transmitting means are communicably connected by one of wire and wireless means for communicating.

5. The indicator of claim 1, wherein said receiving means and transmitting means are communicably connected by one of wire and wireless means for communicating.

* * * * *